United States Patent [19]

Leclercq

[11] 4,297,170
[45] Oct. 27, 1981

[54] DEVICES FOR TRANSVERSELY HOLDING THE FUEL RODS OF A NUCLEAR REACTOR ASSEMBLY

[75] Inventor: Joseph Leclercq, Le Vesinet, France

[73] Assignee: Framatome, Courbevoie, France

[21] Appl. No.: 37,483

[22] Filed: May 9, 1979

[51] Int. Cl.³ ............................................... G21C 3/30
[52] U.S. Cl. .................................... 376/442; 376/438; 376/902
[58] Field of Search .................................... 176/76, 78

[56] References Cited

U.S. PATENT DOCUMENTS

| | | | |
|---|---|---|---|
| 3,068,163 | 12/1962 | Currier | 176/78 |
| 3,715,275 | 2/1973 | Krawiec | 176/78 |
| 3,933,583 | 1/1976 | Jabsen | 176/78 |

Primary Examiner—Donald P. Walsh
Attorney, Agent, or Firm—Haseltine and Lake

[57] ABSTRACT

A device for transversely restraining the fuel rods of a bundle of fuel rods for a nuclear reactor assembly comprises an upper grid, a lower grid and an intermediate grid arranged in the direction of the axes of the fuel rods, each grid defining cells through which the fuel rods extend, the upper and lower grids being identical and made integral, and the intermediate grid being made of resilient material and arranged with its cells staggered transversely relative to those of the upper and lower grids so that the walls of the cells of the intermediate grid press the rods against the walls of the cells of the upper and lower grids.

8 Claims, 5 Drawing Figures

DEVICES FOR TRANSVERSELY HOLDING THE FUEL RODS OF A NUCLEAR REACTOR ASSEMBLY

The present invention relates to a device for transversely holding the fuel rods of a nuclear reactor assembly.

In a nuclear reactor assembly, the fuel bars, or rods, are arranged parallel to one another in the form of a bundle, within which they are held in a uniform arrangement in order to permit the passage of cooling fluid.

In operation, the fuel rods are subjected to vibrations due to the flow of the coolant, to thermal expansion and to swelling due to irradiation. The fuel rods are held in uniform bundles by means of a number of devices providing transverse support, which devices consist of cross-pieces and are produced in the form of grids spaced more or less uniformly along the bundle.

The main functions which a grid of this kind must fulfill are:

to hold the fuel rods in a precise and uniform transverse network, even under the action of transverse forces, to permit the axial lengthening of the rods, and to hold the rods with a sufficient transverse force to restrict the vibrations of the rods under the effect of the coolant which flows around the rods.

Additionally, the grids must oppose flow of the coolant with minimum resistance and, in order to do this, they must present a minimum cross-section in the direction of flow of the coolant. Furthermore, in order to disturb the neutron flux as little as possible, it is necessary to avoid the use of materials with high neutron absorption in the construction of the grids.

For this purpose, grids have been envisaged, for holding the fuel rods in nuclear reactor assemblies, comprising pieces for holding or steadying the fuel bars, these pieces being added inside the cells of the grid or cut out of the material constituting the walls of the cells of the grid. The use of different metals for forming the frame of the grid and elements for elastically holding the fuel rods has also been envisaged.

However, these devices are of complicated construction and do not make it possible to exert transverse forces, of exactly controlled magnitude, on the rods in order to restrict the vibrations of the rods.

According to the invention there is provided a device for transversely holding the fuel rods of a bundle of fuel rods for a nuclear reactor assembly, which rods are arranged parallel to one another, in a uniform arrangement which comprises support means for exerting forces on the rods in transverse directions to restrict vibrations thereof, while permitting axial lengthening of the rods, said support means comprising three subunits comprising grids arranged adjacent one another in the longitudinal direction of the assembly, said subunits comprising:

two end grids each formed by small metal plates which are assembled in a uniform network delimiting cells inside which the rods pass, and whose side walls, parallel to the longitudinal axis of the assembly, are formed by said small metal plates arranged transversely, relative to the assembly, so that their width constitutes the thickness of said grid in the longitudinal direction, said end grids being identical and made integral with one another with a longitudinal spacing along the fuel rods, and an intermediate grid comprising small, elastic metal plates, the width of which is less than the width of said plates of said end grids, and which are assembled in a uniform network delimiting cells inside which the rods pass and arranged between said end grids in said longitudinal space provided therebetween, in a staggered manner in a transverse direction relative to said end grids, so that said elastic walls of the cells of said intermediate grid exert on the fuel rods transverse forces which press the rods against some of said walls of said cells of said end grids, said intermediate grid resting on at least one of said end grids.

In order to provide a clear understanding of the invention, an embodiment of a device according to the invention will now be described, by way of example only, with reference to the accompanying drawings.

Figure 1:
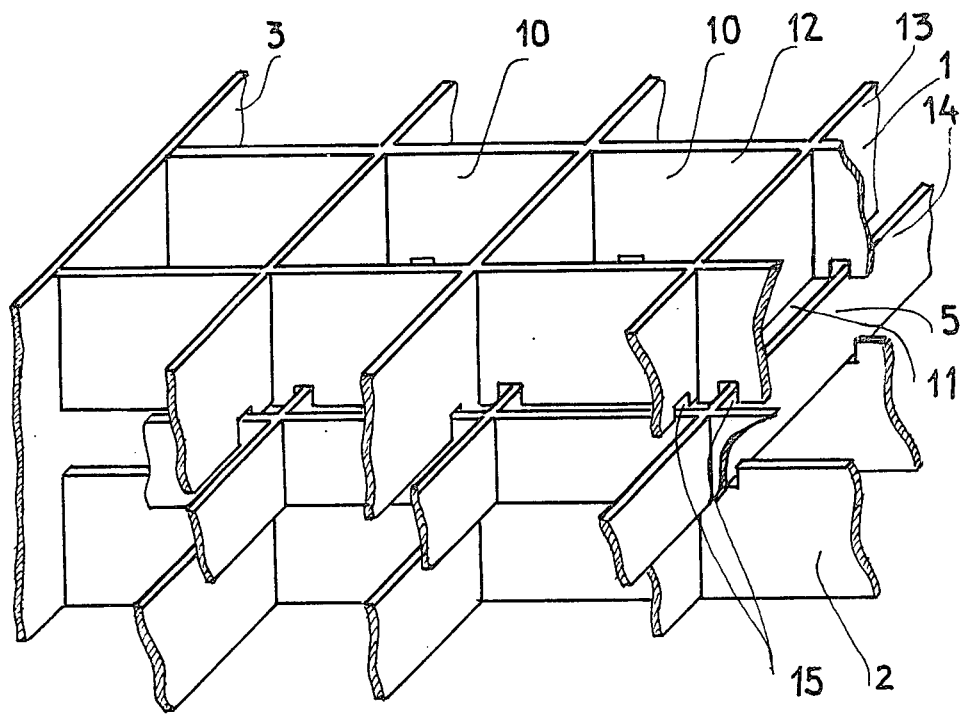
FIG. 1 is an exploded view, in perspective, of a few cells of three grids which form the sub-units constituting an embodiment of a device according to the invention.

FIG. 1 shows part of an embodiment of a device for providing transverse support, according to the invention. The device comprises an upper sub-unit or part, consisting of a grid 1 with square cells 10, a lower sub-unit or part, consisting of a grid 2 and identical to the upper part, and an intermediate sub-unit or part, consisting of a grid 5 with cells 11 some of which are square and which may be of the same size as the cells 10. The grid 5 has a smaller height than the grids 1, 2 constituting the upper and lower parts of the device. The three parts constitute a device for transversely holding the tubes, the dimensions of the cells 10 being sufficient to permit the passage of a tube inside these cells in the longitudinal direction of the assembly, that is to say in the vertical direction in FIG. 1.

The grids 1 and 2 are fixed, at their lateral ends, to a metal plate 3, which makes it possible to maintain a certain longitudinal spacing between the grids 1 and 2.

The grids 1 and 2 consist of small metal plates, such as 12 and 13, which are assembled perpendicular to one another in a rigid manner, with the result that they produce a network, only part of which can be seen in FIG. 1.

This network possesses an extremely large number of meshes or cells 10, which is greater than the number of fuel bars in the assembly, because tubes for holding the assembly pass through some of the cells in place of fuel bars.

The small metal plates 12 and 13, which can be, for example, small plates made of a poorly absorbent material such as Zircaloy, are joined to one another by welding in order to produce a rigid grid of precise dimensions for determining a precise positioning of the fuel rods inside the bundle constituting the assembly.

The intermediate grid 5 consists of small metal plates, the width of which is less than the width of the small metal plates 12 and 13, the network formed by these small plates 14 being essentially identical to the network of the grids 1 and 2 formed by the small metal plates 12 and 13.

Slots 15 are provided in the lower parts of the metal plates 12 and 13 of the upper grid 1, and in the upper parts of the small metal plates 12 and 13 of the lower grid 2.

Figure 2:
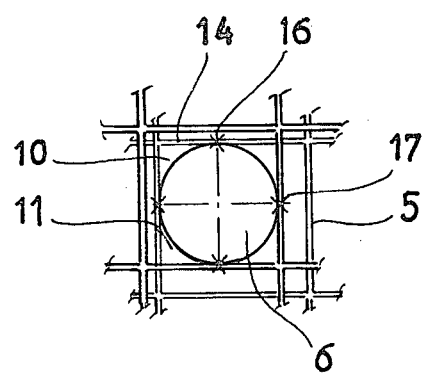
FIG. 2 is a plan view of a cell of one of the end grids, containing a fuel element.

These slots 15 make it possible to place the intermediate grid 5 between the upper and lower grids 1 and 2, so that the intermediate grid 5 is slightly staggered in a transverse direction relative to the grids 1 and 2, as can be seen in FIG. 1 and FIG. 2.

FIG. 2 also shows a fuel element 6 in position inside cell 10 of the upper grid 1, the fuel rod 6 being held in position in the cell 10 by the walls 14 of the intermediate grid in contact with the fuel element along two generatrices which are indicated by the reference 16 on the plan of FIG. 2. The fuel element 6 is also in contact with the walls 12 and 13 of the cell of the upper grid 1 along generatrices 17.

The walls 14 of the intermediate grid 5 are resilient or elastic, which makes it possible to exert a force on the fuel rod 6 when the intermediate grid 5 is staggered by a certain amount in a transverse direction relative to the upper and lower grids 1 and 2. This elastic grid 5 is made of a material of which the elasticity is satisfactorily retained under irradiation, such as INCONEL.

It will be appreciated that the fuel rod 6 is also supported along the generatrices 17 in contact with the walls 12 and 13 of the cell of the grid 2, which is located exactly in line with the cell of the grid 1 shown in FIG. 2.

It is seen that the above described device, although of extremely simple construction, is well suited for accomplishing the various functions which must be fulfilled by a grid for holding the fuel rods of an assembly. In fact, the upper and lower grids 1 and 2 make it possible to hold the fuel rods 6 in an exactly defined network, these grids 1 and 2 constituting a rigid support which is capable of withstanding the transverse forces without being deformed. The unit consisting of the two grids 1 and 2 and the small side plates, forming cross-pieces, is in fact rigid.

The intermediate grid 5, which is arranged in a staggered manner relative to the grids 1 and 2 and consists of small plates 14 made of an elastic material, makes it possible to exert a transverse force on the fuel rods 6, it being possible for this force to be adjusted as a function of the degree of stagger of the grid 5 relative to the grids 1 and 2, and this makes it possible to restrict the vibrations of the fuel elements due to the effect of the flow of coolant. Furthermore, this type of lateral restraint permits axial expansion of the fuel rods when these bars become hot.

In the embodiment shown in FIG. 2, the intermediate grid 5 has been staggered, relative to the upper and lower grids 1 and 2, along the diagonal of the square of the cross-section of a cell, that is to say by equal amounts along the directions of the walls of the cell. In this case, the distribution of the forces is symmetrical.

The intermediate grid 5 can be fixed by any suitable means, the grid 5 applying a force to the fuel elements by virtue of the fact that the grid 5 rests on one of the two grids 1 and 2 or on both these grids.

Figure 3:
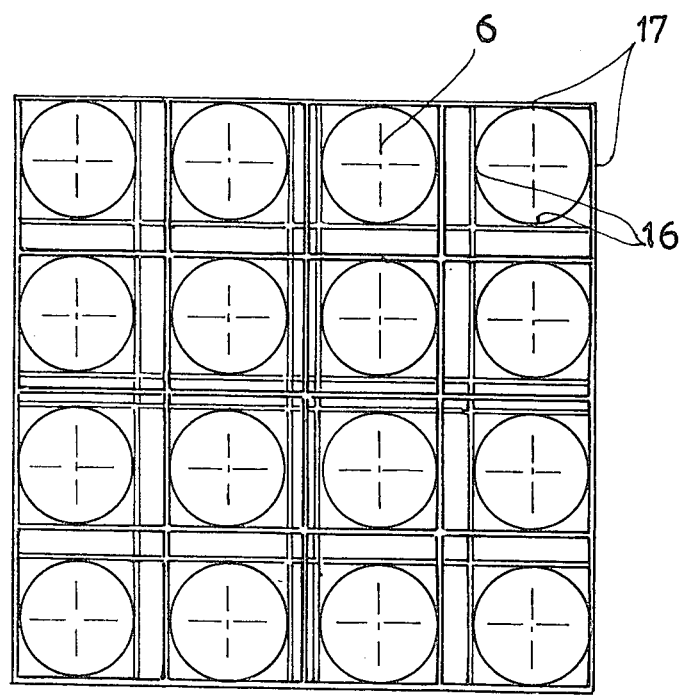
FIG. 3 is a plan view corresponding to a particular embodiment of the invention, in which the device comprises four identical parts.

FIG. 3 shows a particular embodiment of the support device according to the invention, in which the intermediate grid 5 is separated into four sectors bounded by the axes of symmetry of the grid. Each of the sectors is bounded on the inside of the grid 5 by double walls consisting of metal plates 14 welded to one another. The staggering of each of the sectors of the grid 5 is different and symmetrical relative to the axes of symmetry of the grid 5.

A structure of this kind has the advantage that it balances the forces exerted on the rods 6 by the element 5, which element can move relative to the end elements 1 and 2 within the limit of the play provided in the slots 15. A further advantage of this arrangement is that it balances the forces exerted on a set of four cells arranged in a square.

Figure 4:
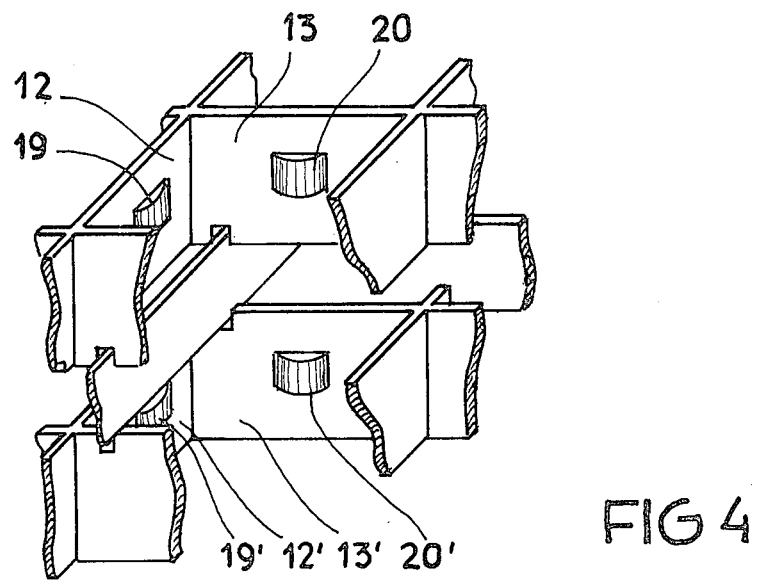
FIG. 4 shows a view, in perspective, of details of the device, according to the invention, in a first embodiment.

FIG. 4 shows the walls 12 and 13 and 12' and 13' of two cells 10 which are arranged vertically relative to one another and respectively belong to the grid 1 and the grid 2. On the walls 12 and 13 and 12' and 13' of the grids 1 and 2 respectively, projections 19 and 20 and 19' and 20' have been provided so that the contact of the fuel rod 6 with the walls 12 and with the walls 13 takes place with the projections 19 and 19' and 20 and 20' respectively, these projections being arranged along one and the same vertical. The projections 19 and 20 and 19' and 20' can be produced by cutting the metal of the walls 12 and 13 and pushing it inwards.

Figure 5:
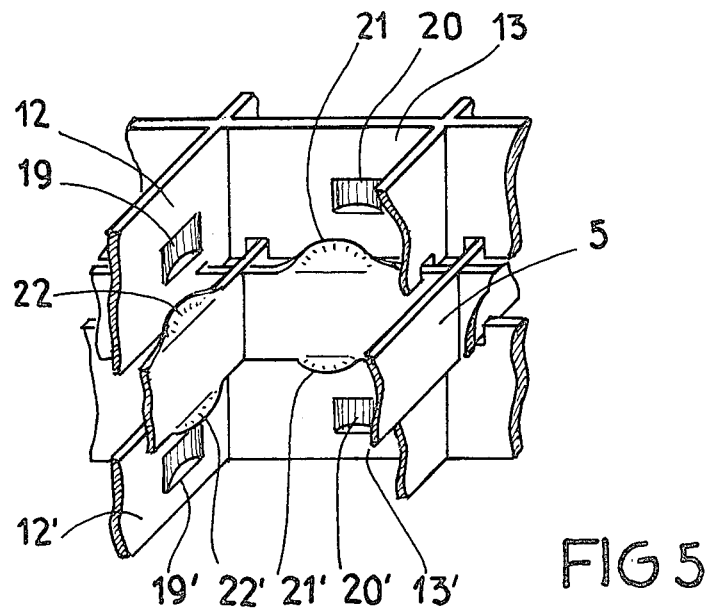
FIG. 5 shows a view, in perspective, of details of a device, according to the invention, in a second embodiment.

FIG. 5 shows an intermediate grid 5 of which the small plates 14, forming the walls of the cells, possess small inclined deflectors 21, 22 and 21', 22' which ensure a connection between the walls of the grid 5 and the walls of the grids 1 and 2. These deflectors facilitate the introduction of the rods during assembly.

The upper and lower edges of the walls of the cells of the grid 5 may also be provided with chamfers which serve the same purpose as the deflectors 21, 22 and 21', 22'.

In a particularly useful embodiment of the invention the grids 1 and 2, on the one hand, and the grid 5, on the other hand, are made of materials which have different coefficients of thermal expansion. This produces an increase in the lateral restraining force on the fuel rods when hot than when cold, which facilitates the insertion of the rods during assembly and provides a sufficient force during operation when hot.

This effect could be achieved, for example, in the case of the embodiment shown in FIG. 3, if the grid 5 had a greater coefficient of thermal expansion than the grids 1 and 2.

The invention is not to be restricted to the embodiments which have now been described, but embraces all variants thereof, and modifications in points of detail can be envisaged without thereby going outside the scope of the invention.

Thus, the shape of the cells and the structure of the grids 1, 2 and 5 are not necessarily identical to the shapes and structures which have been shown, and it is possible to envisage modifications depending on the type of assembly which is to be equipped with a support device according to the invention.

The intermediate grid may consist of a set of individual grids, for example as shown by 5 in FIG. 3, which are juxtaposed in the space between the upper and lower grids, so as to cover the entire transverse surface of the assembly.

It is also possible to envisage any suitable type of positioning and support of the grid 5, relative to the grids 1 and 2, and to envisage improvements, for holding the elements and introducing them into the grids, which improvements are different from those which have been shown in FIGS. 4 and 5.

It is possible to envisage the use of any suitable materials for manufacturing the support device; however, the material for constructing the most massive part of the device, that is to say the set of grids 1 and 2 and their connection, must be a material with low neutron absorption, for example Zircaloy. For constructing the grid 5, which requires good elastic properties and is less massive, it is possible to choose materials as a function of their mechanical properties and of their coefficient of thermal expansion, for example Inconel.

Finally, the device according to the invention can be used for holding the fuel rods in any type of fuel assembly, with rods, which is used in nuclear reactors.

I claim:

1. A device for transversely holding the fuel rods of a bundle of fuel rods for a nuclear reactor assembly, which rods are arranged parallel to one another, in a uniform arrangement, having a plurality of support means for exerting forces on the rods in transverse directions to restrict vibrations thereof, while permitting axial lengthening of the rods, each of said support means comprising three sub-units comprising grids arranged adjacent one another in the longitudinal direction of the assembly, said sub-units comprising:

two end grids each formed by small metal plates which are assembled in a uniform network delimiting cells inside which the rods pass, and whose side walls, parallel to the longitudinal axis of the assembly, are formed by said small metal plates arranged transversely, relative to the assembly, so that their width constitutes the thickness of said grid in the longitudinal direction, said end grids being identical and each grid having the same network as the other, each wall of each cell of one grid being located in the same longitudinal plane as the corresponding wall of the other grid, said grids being made integral with one another with a longitudinal spacing along the fuel rods, and an intermediate grid comprising small, elastic metal plates, the width of which is less than the width of said plates of said end grids, and which are assembled in a uniform network delimiting cells inside which the rods pass and arranged between said end grids in said longitudinal space provided therebetween, in a staggered manner in a transverse direction relative to said end grids, so that two adjacent elastic walls of the cells of said intermediate grid exert on each fuel rods transverse forces which press the rods against two walls of said cells of each end grid, said intermediate grid resting on at least one of said end grids.

2. The device according to claim 1, wherein at least said one of said end grids is provided with slots, in that part thereof which is in contact with said intermediate grid, for holding said intermediate grid in place relative to said end grids, with the possibility of transverse adjustment.

3. The device according to claim 1, wherein said intermediate grid has two axes of symmetry, said transverse staggering of said intermediate grid in each of its parts delimited by said axes of symmetry being symmetrical with said staggering in the other parts of said grid, relative to the axes of said grid.

4. The device according to claim 1, wherein said intermediate grid comprises a set of individual grids which are juxtaposed so as to cover the entire transverse surface of said assembly.

5. The device according to claim 1, wherein the walls of said cells of said end grids in contact with the fuel rods are provided with projections for engaging the rods.

6. The device according to claim 1, wherein the edges of said small metal plates of said intermediate grid are provided with projections or chamfeers for facilitating the guiding of the rods when they are introduced.

7. The device according to claim 1, largely consisting of small plates made of a metal with low neutron absorption.

8. The device according to claim 1, wherein the metal of said small metal plates of said intermediate grid has a higher coefficient of expansion than the metal of said small metal plates of said end grids.

* * * * *

UNITED STATES PATENT AND TRADEMARK OFFICE
CERTIFICATE OF CORRECTION

PATENT NO. : 4,297,170
DATED : October 27, 1981
INVENTOR(S) : Joseph Leclercq

It is certified that error appears in the above—identified patent and that said Letters Patent is hereby corrected as shown below:

On the cover sheet Insert Foreign Application Priority Data

-- May 19, 1978    France    78-14860 --

Signed and Sealed this

Thirtieth Day of March 1982

[SEAL]

Attest:

Attesting Officer

GERALD J. MOSSINGHOFF

Commissioner of Patents and Trademarks